Aug. 27, 1963   G. R. PAUL   3,102,256
TOLL TICKETING READ-OUT PRINTING SYSTEM
Filed Aug. 27, 1957   7 Sheets-Sheet 1

INVENTOR
GERALD R. PAUL
BY
Francis E. Blake
ATTORNEY

Aug. 27, 1963   G. R. PAUL   3,102,256
TOLL TICKETING READ-OUT PRINTING SYSTEM
Filed Aug. 27, 1957   7 Sheets-Sheet 3

FIG. 3

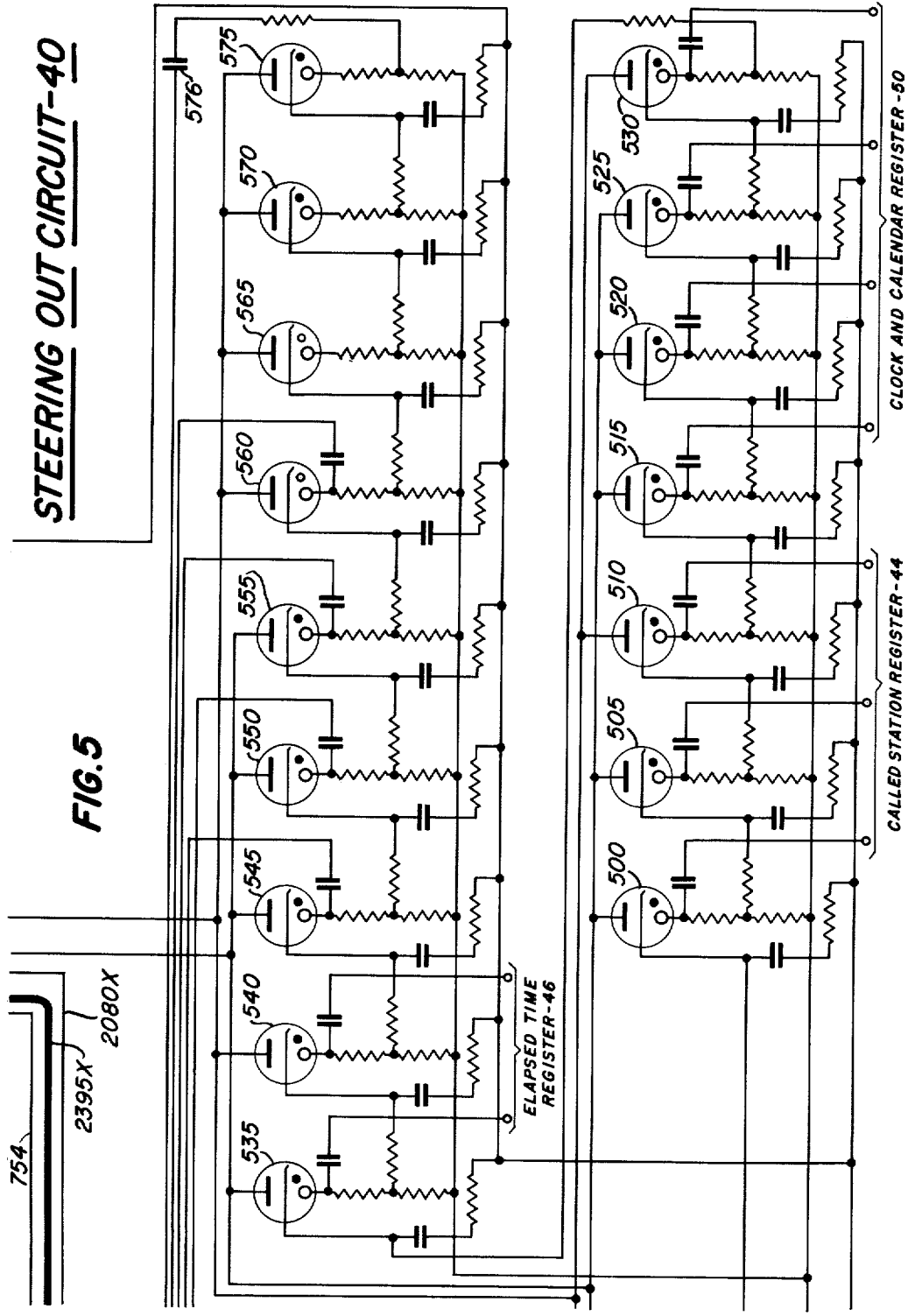

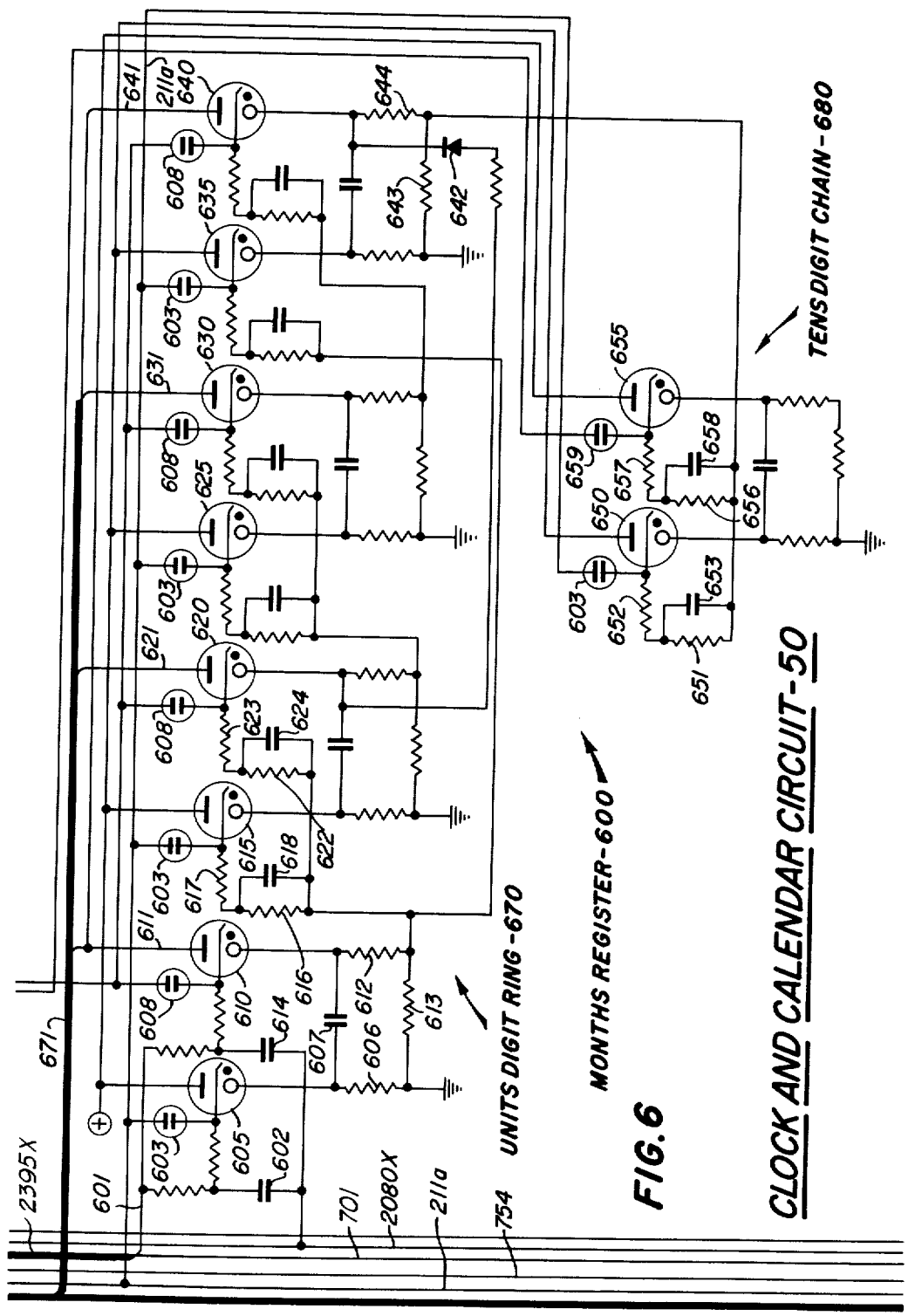

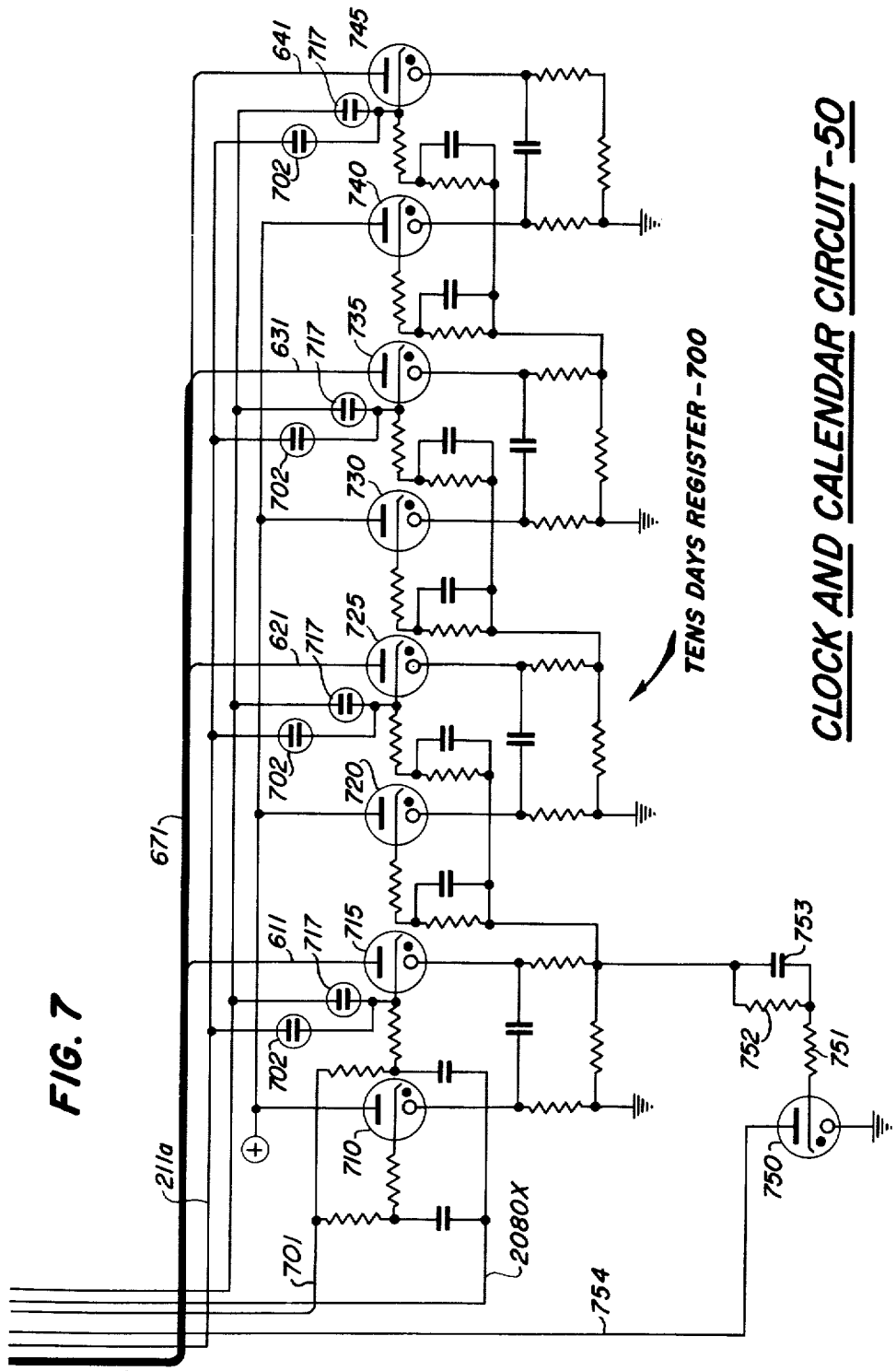

3,102,256
TOLL TICKETING READ-OUT PRINTING SYSTEM
Gerald R. Paul, Webster, N.Y., assignor to General Dynamics Corporation, Rochester, N.Y., a corporation of Delaware
Filed Aug. 27, 1957, Ser. No. 680,565
9 Claims. (Cl. 340—172.5)

This invention relates to a data handling system and, more particularly, to a system for storing and recording items of data.

In the copending application of Frank A. Morris et al., Serial No. 348,202, filed April 13, 1953, now Patent No. 2,886,642, there is disclosed an automatic toll ticketing system in which the items of information pertaining to a plurality of toll calls are collected and stored on a length of magnetic tape in a recorder individual to a telephone trunk circuit. This trunk recorder is periodically seized and the data stored on the tape is reproduced and transmitted to a plurality of electronic registers in which it is temporarily stored and used to control the operation of a printer which provides permanent records or printed toll tickets. During the playback and the recording of data stored on the tape, the telephone equipment associated with the seized trunk recorder is busied out with a consequent reduction in the traffic handling capacity of the telephone system. Therefore, it is desirable to reduce the holding or seizure time of the trunk recorder to a minimum by reducing the time required to reproduce, store, and record the data contained on the magnetic tape. Further, since all of the items of information pertaining to a single call are concurrently stored in individual electronic registers during the playback operation, it is desirable to provide electronic registers together with control circuits therefor which are easily and economically fabricated.

Accordingly, one object of the present invention is to provide new and improved means for handling data items.

Another object is to provide means for electronically storing and recording digital data.

A further object is to provide a data handling system including electronic register means and new and improved means for reading out and recording data stored in said register means.

A further object is to provide new and improved means for reading stored data out of a plurality of registers.

Another object is to provide a data handling system including means responsive to the transition of the conductive pattern in an electronic register for one representing an entered digit to one representing a predetermined condition for providing a control effect representing the value of the entered digit.

A still further object is to provide a data handling system including an electronic register having a plurality of electronic devices operated to a pattern of conductive and nonconductive conditions representing an entered digit and means for reading out the value of the entered digit comprising means for operating a selected group of the devices to a conductive condition and means responsive to the change in the pattern caused by the operation of the selected devices to provide a control effect representing the value of the entered digit.

Another object is to provide a data handling system including a plurality of electronic output devices which are selectively operated under the control of a group of electronic registers rendered effective in sequence by a counting circuit and which are also selectively operated under the direct control of the counting circuit to enter fixed items of information.

In accordance with these and many other objects, an embodiment of the present invention comprises a telephone system including a plurality of trunk recorders each of which is provided with an endless loop of magnetic tape on which are stored items of information pertaining to toll calls. The successive items are recorded on the tape in the form of groups of mark or intelligence pulses which are separated by space or control pulses, each group of items pertaining to an individual call being followed by an end-of-call signal. During a playback or recording operation, the trunk recorders are sequentially seized by a playback control circuit so that the mark or data pulses and the space or control pulses are reproduced and transmitted to recording facilities including a plurality of electronic registers, each of which is adapted to store one of the items of information pertaining to a single toll call. A steering in circuit is provided controlled by the space pulses for sequentially enabling each of the electronic registers to receive the following group of mark pulses representing an item of digital data which is to be stored. At the completion of the storage of all of the items of information pertaining to a toll call, the end-of-call signal is transmitted to and received by a printing control circuit to interrupt the transmission of additional data until the data stored in the electronic register is recorded.

Each of the electronic registers includes a plurality of pairs of cold cathode gaseous discharge tubes which are selectively conditioned for operation in accordance with the binary coded representation of the digits stored in the connected recorder, the pairs of tubes being connected in a counting circuit to be responsive to the group of mark pulses applied to the input thereof under the control of the steering in circuit. All of the cold cathode tubes or electronic devices in each of the electronic registers is normally provided with a B+ operating potential to permit the operation of the register as a counting circuit during the entry of a digit into the register. However, during a readout cycle of operation which is initiated by the receipt of the end-of-call code by the printing control circuit, one of the tubes in each of the pairs, preferably the binary "1" tube, is disconnected from B+ potential and connected to an operating potential through the primary winding of a coupling transformer, the secondaries of the coupling transformers being connected to the control electrode of four electronic output devices. The anode circuits of the four output devices are connected to the operating windings of control solenoids in a selecting mechanism forming a part of a recorder or printer. In addition to the four electronic output devices which are coupled in common to the tubes in all of the electronic registers, two additional electronic output devices, which are connected to the selecting mechanism in the printer, are provided for controlling the printing of alphabetical characters and the performance of control operations.

In order to sequentially readout each of the individual items stored in the electronic registers, a steering out circuit is provided comprising a counting chain including a cold cathode discharge device for each of the electronic registers, for each of the control operations which is to be performed, and for each of the alphabetical characters which is to be recorded. The cathodes of a group of the tubes in the steering out circuit are coupled to the binary "1" tubes in the registers so that, as each of these tubes is fired, an operating pulse is applied to all of the binary "1" tubes in a given register. If the tube is standing in a conductive condition as a result of the entry of a digit, the conductive state of the tube is not varied. However, if the tube is in a nonconductive condition, the pulse supplied from the steering out circuit renders the tube conductive and produces a current flow through the primary of the associated coupling transformer so that an operating signal is supplied to the control electrode of the related electronic output device, thereby to energize the winding of the related selector magnet. Since all of the binary "1" tubes in a given register are simultaneously provided with an operating signal, the printer is simultaneously provided with one or more operated selector magnets in accordance with the binary complement of the entered digit, thereby causing the printer to record the digit stored in the selected electronic register. The operation of the printer to record this digit supplies an operating pulse to the steering out circuit so that the next tube therein is rendered conductive, thereby to readout the next electronic register. Certain of the tubes in the steering out circuit are directly coupled to the control electrodes of the electronic output devices so that predetermined ones of these devices are rendered conductive to supply signals representing certain control operation, such as carriage return or line feed, to the printer or to provide alphabetical information, such as the characters of the called or calling office, directly to the printer.

Incident to the recording of the last entry by the recorder or printer, the steering out circuit restores itself to a normal condition and advises the printing control circuit that the items of information pertaining to the next toll call stored on the magnetic tape in the seized trunk recorder can be transmitted. Further, incident to this operation the printing control circuit clears all of the electronic registers to a normal condition in which they are capable of receiving the items of information pertaining to the next toll call. Following the completion of the recording of the items of information stored in the seized trunk recorder, the playback control circuit seizes the remaining trunk recorders so that the items of information stored therein are recorded.

Many other objects and advantages of the present invention will become apparent from a consideration of the following detailed description thereof when taken in conjunction with the drawings wherein:

FIGS. 2 and 3 are a schematic diagram of a printing control circuit shown in conjunction with some of the components of an automatic toll ticketing system of the type illustrated in the above identified copending application;

FIGS. 4 and 5 illustrate a steering out circuit;

FIG. 6 illustrates the details of a month register;

FIG. 7 is a circuit diagram of a tens days register; and

FIG. 8 is a diagram showing the manner in which FIGS. 2–7 of the drawings are placed adjacent each other to form a complete circuit diagram of an embodiment of the present invention.

Figure 1:
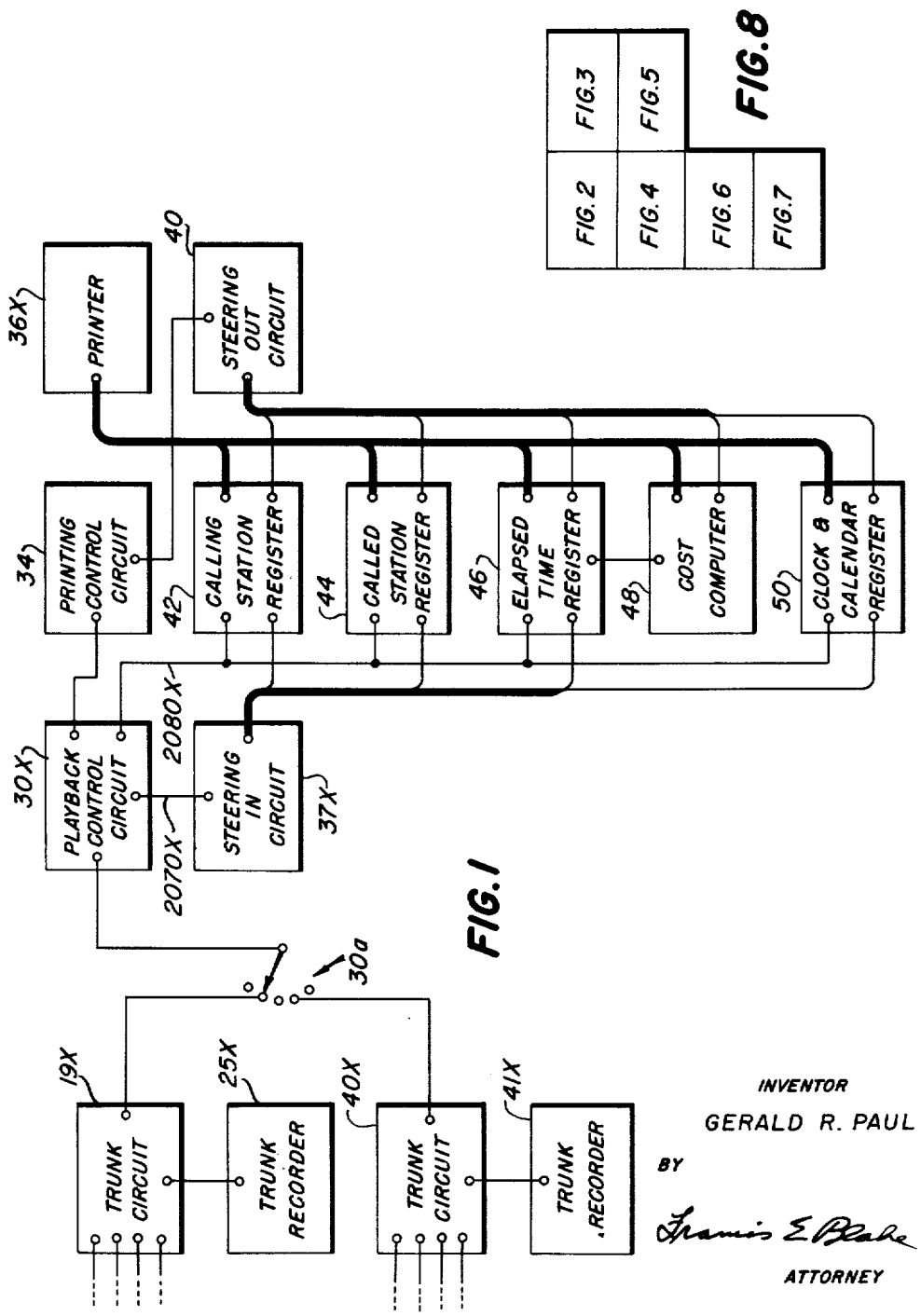
FIG. 1 is a block diagram illustrating the major components of a system embodying the present invention.
Figure 2:
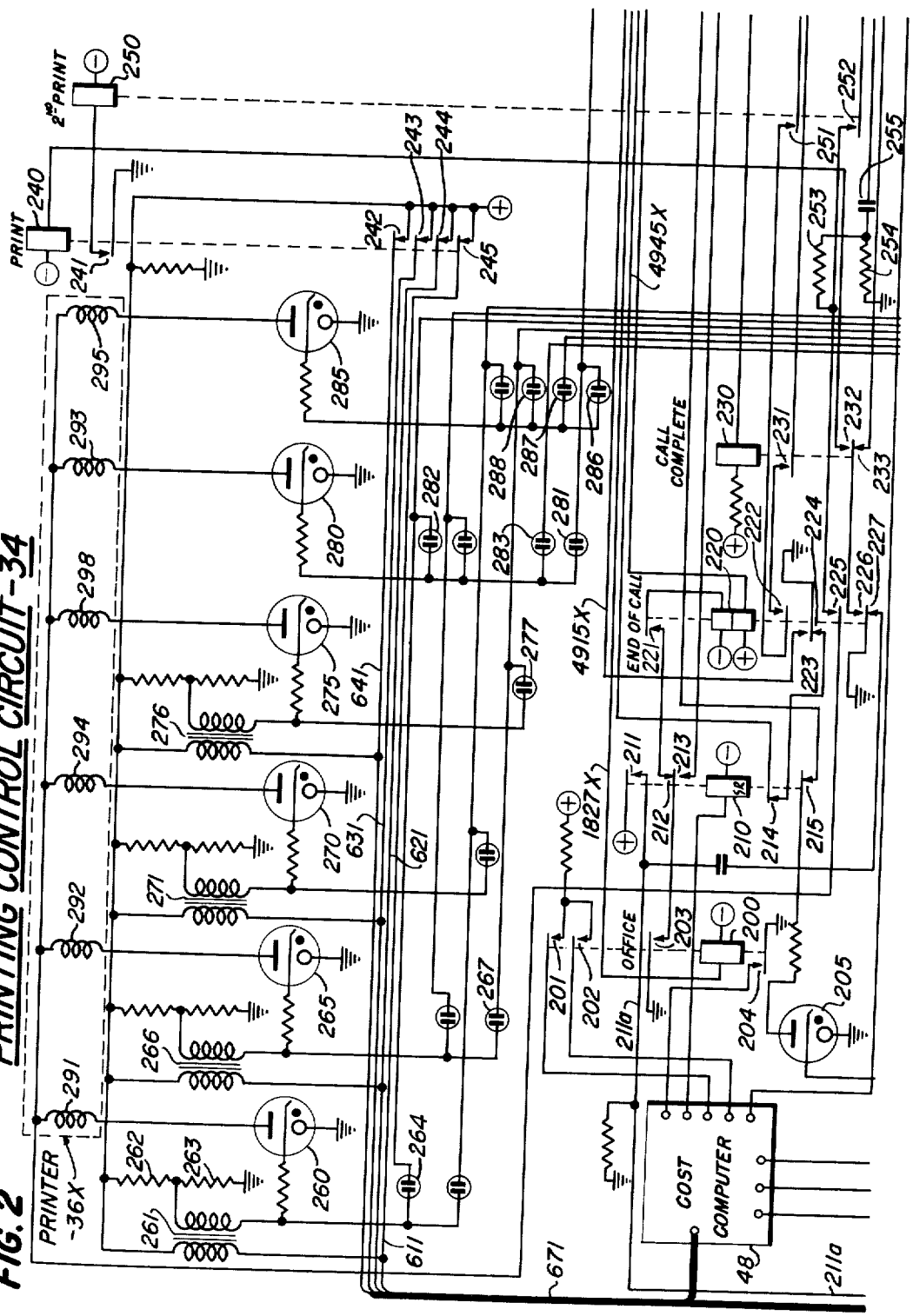
Figure 4:
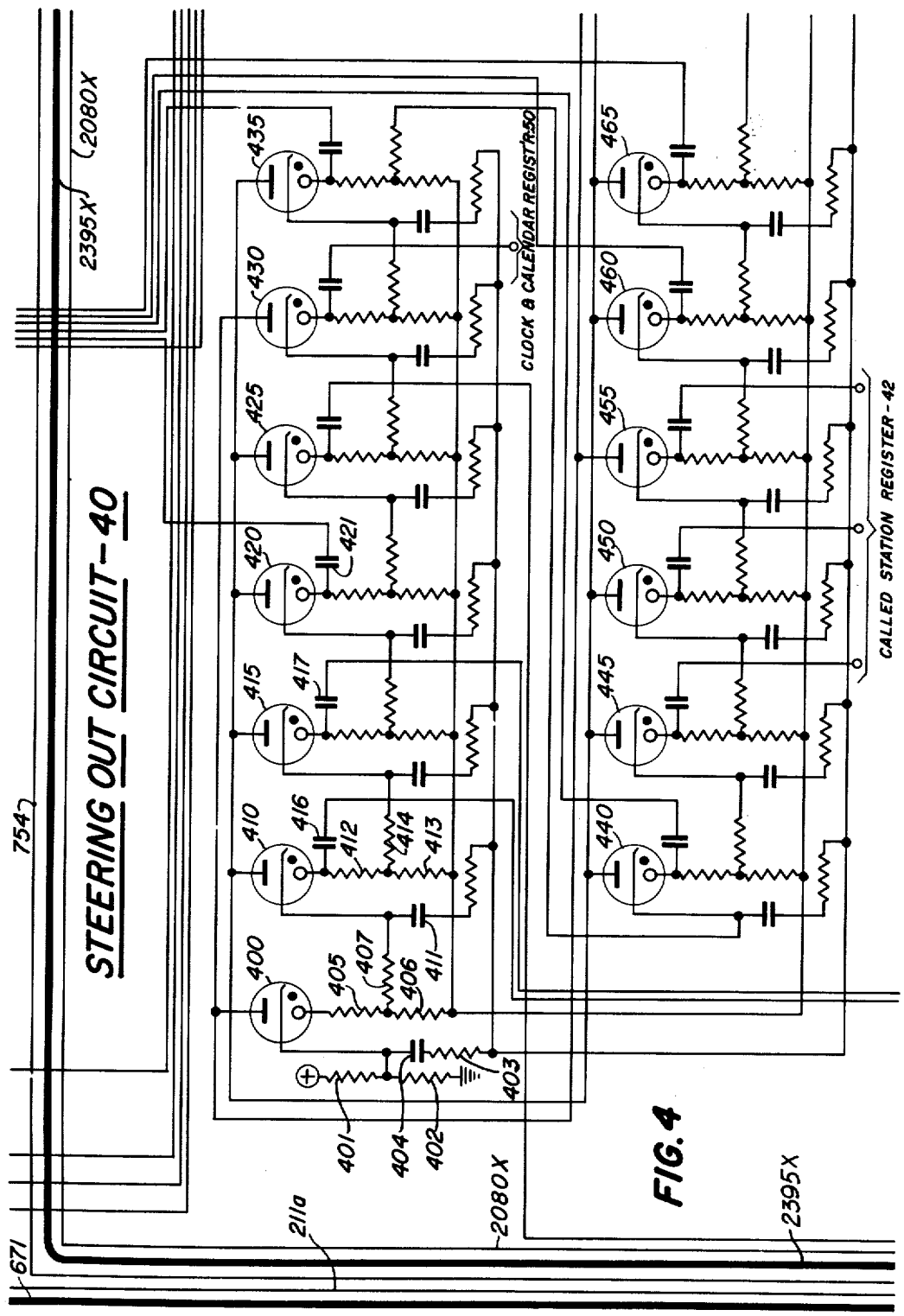

Referring now to FIG. 1 of the drawings, therein is disclosed an embodiment of the data handling system of the present invention shown in conjunction with certain components of the automatic toll ticketing system disclosed and described in detail in the above identified Morris et al. patent. The components of the system which are identical to similar circuits in the Morris et al. patent are designated by a reference number followed by the suffix "X." In this prior automatic toll ticketing system, when short or long haul toll calls are to be placed to a remote exchange, an access digit is dialed to seize one of a pair of trunk circuits 19X or 40X which terminate trunks extending to the remote exchanges. Each of the trunk circuits 19X and 40X is provided with an individually connected trunk recorder 25X or 41X in which the items of information pertaining to the toll calls placed to the associated trunk circuit are recorded.

The trunk recorders 25X and 41X preferably are of the type disclosed in the copending application of Howard S. Gleason, Serial No. 378,209, filed September 3, 1953, now Patent No. 2,867,435. As disclosed therein, the trunk recorders 25X and 41X each include an endless loop of magnetic tape adjacent to which two transversely spaced transducing heads are disposed to provide two effective channels on the magnetic tape. One of these channels is adapted to receive intelligence or mark pulses and the other of these channels is adapted to receive control or space signals, the space signals being interposed between consecutive groups of mark pulses to define the effective ends thereof. These trunk recorders include a step-by-step drive mechanism for advancing the magnetic tape step-by-step during a recording operation and a selectively controlled continuous drive mechanism for advancing the endless loop of magnetic tape continuously during reproducing or retransmitting operations.

Incident to the seizure of one of the trunk circuits 19X or 40X during the extension of a toll call to a remote exchange, the trunk circuit 19X, for instance, is conditioned to repeat three dialed digits representing the designation of the calling station to the trunk recorder 25X, each group of mark pulses including a number of pulses equal to the value of the dialed digit. Each of the three groups of mark pulses is followed by a space pulse indicating the end of the recording of each of these digits. The trunk circuit 19X next transmits three groups of mark pulses representing the three digits of the designation of the called station which are recorded on the mark channel of the magnetic tape together with space pulses representing the ends of these three digits. Thereafter, the trunk circuit 19X records a group of mark pulses representing the duration of the toll call in which each pulse represents a one minute increment of elapsed time.

Following the completion of the recording of the elapsed time information, the trunk recorder 19X calls in a common clock and calendar circuit (not shown) which supplies seven groups of mark pulses to the trunk recorder 25X representing the date and time at which the call was placed. These seven groups of mark pulses, each of which is separated by a space pulse, includes two groups representing tens and units hours, two groups representing tens and units minutes, a single group representing months, and two groups representing tens and units days. However, it should be noted that the form in which the mark pulse information is provided by the clock and calender circuit differs somewhat from that provided by the trunk circuit 19X representing the designation of the called and calling station. To provide this latter information, the trunk circuit 19X is directly controlled by dialed digits repeated from the calling substation in which the digit "1" is represented by a single mark pulse and "0" is represented by ten mark pulses. Generally, in the clock and calendar circuit a single pulse represents "0" and ten pulses represent the digit "9." For instance, the tens days digit "5" is represented by a group of six mark pulses. The months data, however, is provided in the same manner as the dialed station digit inasmuch as the designation "11," representing the month of November, is recorded on the magnetic tape of a trunk recorder as a group of eleven mark pulses.

Following the completion of the recording of the date and time information, the trunk circuit 19X releases the common clock and calendar circuit and records an end-of-call signal on the magnetic tape comprising simultaneously recorded mark and space signals. This end-of-call signal signifies the completion of the recording of all of the items of information pertaining to a toll call. In the event that the call is released prior to the receipt of answering supervisory signals from the calling subscriber in the remote exchange, the trunk circuit 19X records an end-of-call signal on the magnetic tape prior to the recording of the elapsed time information. During the playback of the data stored in the trunk recorder, the receipt of an end-of-call signal prior to the registration of the date and time information signifies that the call was not completed, and the recording facilities discard the previously stored data relating to the designations of the calling and called stations so that permanent records of data pertaining to incomplete calls are not provided. Following the completion of the recording of the end-of-call signal or code, the trunk circuit 19X and the trunk recorder 25X are restored to their normal condition. Since the trunk recorder 25X is capable of storing items of information pertaining to a plurality of toll calls, the trunk circuit 19X operates as described above to record items of information pertaining to each toll call extended therethrough during a given chronological interval.

When the data stored in the trunk recorders 25X and 41X is to be recorded in permanent form, a playback control circuit 30X is placed in operation to advance a switching 30a associated therewith to search for and seize all of the idle trunk circuits together with their associated trunk recorders. When the trunk circuit 19X, for instance, is seized, the transducing heads in the trunk recorder 25X are cut through to the input of the playback control circuit 30X and a control ground is forwarded to the clutch mechanism associated with the continuous drive in the trunk recorder 25X so that the magnetic tape therein is advanced to transmit the items of information pertaining to the first toll call to the playback control circuit 30X. Mark and space amplifying means provided therein receive the reproduced mark and space pulse information and apply the mark pulse signals to a common mark pulse conductor 2080X which is connected in common to the input of all of a plurality of registers comprising a calling station register 42, a called station register 44, an elapsed time register 46, and a clock and calendar register 50. The space pulses are amplified and applied to a space pulse conductor 2070X which is connected to the input of a steering in circuit 37X. The steering in circuit 37X comprises a counting chain which provides an enabling potential to an input gate for each of the registers 42, 44, 46 and 50, thereby directing the spaced groups of mark pulses appearing on the mark pulse conductor 2080X relating to a single toll call to the proper ones of the above identified registers to permit each group of mark pulses to be stored in a separate electronic register. It should be noted that the recording equipment also includes a cost computer 48 which receives elapsed time signals concurrently with the application of these signals to the elapsed time register 46 so as to establish the monetary charge to be assessed for the toll call.

In general, each of the electronic registers 42, 44, 46 and 50 comprises a plurality of separate electronic registers each including, in general, four cold cathode binary tube pairs in each of which one or the other of the two tubes is in a conductive condition to provide a representation of either binary "0" or "1." The four binary pairs in each of the separate electronic registers are connected as a counting circuit so that, upon application of the proper group of mark pulses to the enabled input thereof, the register is advanced to a pattern of conductive and nonconductive conditions representing the binary code for the entered digit.

To provide a means for reading out the values of the digits entered into the electronic registers, a group of six electronic output devices is provided, the control electrodes of four of which are connected to the secondary windings of four coupling transformers. The primary windings of these transformers are connected between B+ potential and the anodes of all of the binary "1" tubes in similar orders of all of the electronic registers. In other words, the anodes of the binary "1" tubes in the input binary pairs in all of the electronic registers are connected to B+ potential through the primary winding of a single coupling transformer and, in a similar manner, the remaining three binary pairs in the electronic registers are each connected in common to B+ potential through the primary winding of one of the three remaining coupling transformers.

When all of the items of information pertaining to the toll call have been stored in the electronic registers 42, 44, 46 and 50, the end-of-call signal is transmitted to the printing control circuit 34 so that further movement of the magnetic tape in the seized trunk recorder 25X is arrested until the items of information stored in the registers have been printed. In response to the receipt of the end-of-call code, the printing control circuit 34 disconnects the anodes of the "1" binary tubes from direct B+ potential and connects them to B+ potential through the primary windings of the four coupling transformers, thereby rendering the electronic output devices responsive to control from the individual electronic registers. Further, upon the receipt of the end-of-call code, the printing control circuit 34 places a steering out circuit 40 in operation. The steering out circuit 40 comprises a counting chain of cold cathode tubes which are operated step-by-step. When the first tube in the steering out circuit 40 is fired, an operating signal is concurrently supplied to the control electrodes of all of the binary "1" tubes in the first electronic register. This operating signal is effective to fire only the binary "1" tubes which are standing in a nonconductive state. Firing the nonconductive binary "1" tubes induces a potential in the related coupling transformers so that the electronic output devices corresponding to the previously nonconductive binary "1" tubes are rendered conductive to selectively energize one or more of the selector magnets in an output printer 36X, thereby conditioning the printer to record the digit stored in binary form in the first electronic register.

Incident to this recording operation, the printer 36X and the printing control circuit 34 supply an operating signal to the steering out circuit 40 so that the next tube therein is rendered conductive to supply an operating signal to the next or second electronic register, thereby operating this register to transmit a binary coded representation of the value of the entered digit to the printer 36X and thus to record this second digit. Certain of the tubes in the steering out circuit 40 are directly coupled to the control electrodes of the six electronic output devices through a neon lamp matrix arrangement so that one or more of these tubes are directly fired by the firing of the related tube in the steering out circuit 40, thereby to supply information to the printer 36X representing either alphabetical characters or control operations, such as a carriage return. Following the completion of the recording of the last item of information by the printer 36X, the steering out circuit 40 supplies a control signal to the printing control circuit 34 indicating the completion of the recording of all of the items of information pertaining to the first toll call. The printing control circuit 34 utilizes this signal to reset all of the registers 42, 44, 46 and 50, the steering in circuit 37X, the steering out circuit 40, and the computer 48 to a normal condition.

The restoration of the registers and the steering in and out circuits to their normal condition completes the conditioning of the recording equipment for receiving and recording the items of information pertaining to the next toll call. Accordingly, the printing control circuit 34 now advises the playback control circuit 30X that the items of information pertaining to the next toll call can be transmitted to the registers. This intermittent operation continues until such time as all of the items of information stored in the trunk recorder 25X pertaining to complete calls has been recorded by the recorder 36X. Thereafter, the playback control circuit 30X advances the switch 30a to seize the next idle trunk circuit and trunk recorder, which may be the trunk circuit 40X and the trunk recorder 41X. The items of information stored in the seized trunk recorder 41X are then recorded by the printer 36X and the playback control circuit 30X operates the switch 30a to seize the next available trunk recorder. Following the completion of the recording of all the items of information in the trunk recorders to which the switch 30a has access, the recording facilities are returned to their normal condition.

Storing Information in the Electronic Registers

Referring now to FIGS. 2–7 of the drawings, when a playback operation of the automatic toll ticketing system is to be initiated, a start ground is supplied to the playback control circuit 30X, as described in detail in the above identified Morris et al. patent. In response to the receipt of this start ground, the playback control circuit 30X initiates operation of the switch 30a associated therewith so that an idle trunk circuit and its associated trunk recorder, such as the trunk circuit 19X and the trunk recorder 25X, are seized to permit the items of information stored on the magnetic tape in the recorder 25X to be recorded in permanent form by the printer 36X. Incident to the seizure of an idle trunk circuit, the playback control circuit 30X returns ground over a wiper of the switch 30a to a conductor 1827X, thereby completing an obvious operating circuit for a called office relay 200 in the printing control circuit 34. The operation of the relay 200 closes a plurality of contacts 201, 202, 203 and 204. The closure of the contacts 201, 202 and 204 supplies rate information to the cost computer 48, and the closure of the contacts 203 provides a source of holding ground for the circuit 34.

Further, incident to the seizure of the trunk recorder 25X, the playback control circuit 30X forwards the ground received from the printing control circuit 34 over a circuit including a plurality of normally closed contacts 224 and 214 and a conductor 4945X to the trunk recorder 25X to engage the continuous drive clutch mechanism. This initiates continuous movement of the magnetic tape in the recorder 25X relative to the transducing heads therein so that mark and space signals are transmitted through the playback control circuit 30X to a group of space pulse amplifiers 32X and 34X and a group of mark pulse amplifiers 31X and 33X. The amplified mark pulses are applied to the common mark pulse conductor 2080X to be supplied to the inputs of all of the electronic registers 42, 44, 46 and 50. The amplified space pulses are applied to the space pulse conductor 2070X to be supplied to the steering in circuit 37X.

As set forth in detail in the above identified Morris et al. patent, the steering in circuit 37X operates to render the electronic registers 42, 44, 46 and 50 repsonsive in sequence to the groups of mark pulses appearing on the conductor 2080X. An output cable 2395X includes a plurality of individual conductors, each one of which extends between the cathode of one of the tubes in the steering in circuit 37X and the control electrodes of an input binary pair in one of the electronic registers. The steering in circuit 37X is operated by the received space pulses to gate the spaced groups of mark pulses appearing on the conductor 2080X representing the calling station designation into the register 42, those representing the called station into the register 44, those representing the elapsed time into the elapsed time register 46, and those representing the hours and minutes digits into the proper registers in the clock and calender register circuit 50. Following the storage of the units minutes digit in the clock and calendar register circuit 50, the steering circuit 37X disables the input to the units minutes register and supplies a positive potential to a conductor 601 in the cable 2395X, thereby rendering a months register circuit 600 in the clock and calendar register circuit 50 responsive to the next group of mark pulses which represents the numerical designation of the month in which the toll call was made.

The months register 600 (FIG. 6) includes a units digit counting ring 670 which is advanced through a cycle of operation in response to the receipt of ten mark pulses and which, when so operated, supplies an operating pulse to a tens digit counting chain 680. The units digit counting ring 670 is of the general type disclosed and described in detail in the copending application of Frank A. Morris et al., Serial No. 666,888, filed June 20, 1957, now Patent No. 2,995,411, or in an article entitled "Cold-Cathode Counting Circuits" by H. L. Foote appearing in Communications and Electronics, No. 18, May 1955.

The units digit ring 670 includes four connected pairs of cold cathode discharge tubes 605 and 610, 615 and 620, 625 and 630, and 635 and 640. The odd designated tubes 605, 615, 625 and 635, which are normally in a conductive condition, represent binary "0" whereas the even designated tubes represent the binary digit "1." The anodes of the tubes 605, 615, 625 and 635 are connected to a fixed source of B+ potential, but the anodes of the binary "1" tubes 610, 620, 630 and 640 are connected to B+ potential through a plurality of conductors 611, 621, 631 and 641 which extend to the printing control circuit 34 through a cable 671 and which are connected to B+ potential through a plurality of normally closed contacts 242, 243, 244 and 245, respectively. These latter anodes are also connected to B+ potential in parallel with the contacts 242, 243, 244 and 245 through the primary windings of four coupling transformers 261, 266, 271 and 276. Since the binary "0" tubes 605, 615, 625 and 635 are normally in a conductive condition to provide a positive potential drop across their cathode resistors, such as a resistor 606, a coupling condenser individual to each of the pairs of tubes, such as a condenser 607, is normally charged to a positive potential equaling the drop across the cathode resistor.

When the enabling potential is applied to the conductor 601, thereby providing an operating bias for the control electrodes of the two tubes 605 and 610 forming the first binary pair, these tubes are rendered responsive to the pulses applied to the mark pulse conductor 2080X. The first mark pulse is coupled through a pair of condensers 602 and 614 to the control electrodes of the tubes 605 and 610. Since the tube 605 is in a conductive condition, the tube 610 is fired to provide a positive potential drop across a pair of cathode resistors 612 and 613. The drop across the resistors 612 and 613, together with the potential to which the coupling condenser 607 has been charged, momentarily elevates the cathode potential of the tube 605 to a point at which conduction no longer can be sustained and, accordingly, this tube is extinguished. In addition to extinguishing the tube 605, the firing of the tube 610 provides an enabling potential for the two tubes 615 and 620 forming the second binary pair. The junction of the resistors 612 and 613 is connected through a pair of resistors 616 and 617 to the control electrode of the tube 615 and through a pair of resistors 622 and 623 to the control electrode of the tube 620.

When the next or second mark pulse is supplied to the condenser 602 and 614, the tube 605 is rendered conductive so that the potential drop across the cathode resistor 606, when considered together with the voltage to which the condenser 607 has been charged, momentarily elevates the cathode potential of the tube 610 so that this tube is extinguished. The momentary elevation of the cathode potential of the tube 610 also supplies a positive pulse through a pair of coupling condensers 618 and 624 to the control electrodes of the tubes 615 and 620. However, since the tube 615 is in a conductive condition, only the tube 620 is fired and, in being rendered conductive, extinguishes the tube 615. The firing of the tube 620 provides an enabling potential for the tubes 625 and 630 in the third binary pair in the same manner as described above. Accordingly, in response to the receipt of two mark pulses, the binary "0" tubes 605, 625 and 635 are placed in a conductive condition and the binary "1" tube 620 is fired, thereby to provide a binary manifestation of the digit "2."

The units digit ring 670 operates in the manner described above under the control of the applied mark pulses until such time as the binary "1" tube 630 in the third binary pair is extinguished in response to the application of the eighth mark pulse to the input of the ring 670. Extinguishing the tube 630 fires the binary "1" tube 640 in the fourth binary pair, and the firing of the tube 640 extinguishes the binary "0" tube 635. Since the units digit counting ring 670 is to pulse the tens digit counting chain 680 following the receipt of ten mark pulses and is to be restored to a zero setting at this time, the normal binary counting progression of the ring 670 is modified. Accordingly, when the tube 640 is rendered conductive, the positive potential drop across a pair of cathode resistors 643 and 644 biases a rectifier 642, which is connected to the cathode of the binary "1" tube 620 in the second binary pair, in its forward direction so that the cathode of the tube 620 rises to the elevated positive potential of the binary "1" tube 640 in the fourth binary pair.

When the ninth mark pulse is applied to the units digit counting ring 670, the tube 610 is fired and the tube 605 is extinguished, thereby conditioning a second binary pair including the tubes 615 and 620 for operation upon receipt of the tenth mark pulse. In addition, the firing of the tube 610 forwards a positive potential to the control electrode of the binary "0" tube 635 in the fourth binary pair to condition this tube for being rendered conductive. When the tenth mark pulse is applied to the input of the ring 670, the tube 605 is rendered conductive and the tube 610 is extinguished. Incident to extinguishing the tube 610, an operating pulse is applied to the conductive tube 615 and the extinguished tube 620 in the second binary pair. However, due to the elevated potential of the cathode of the tube 620, this tube is not rendered conductive and the tube 615 remains in a conductive condition. The momentary elevation of the cathode potential of the tube 610 is, however, effective to fire the binary "0" tube 635 in the fourth binary pair so that, by means of its cathode coupling condenser, the tube 640 is extinguished. Extinguishing the tube 640 removes the forward bias for the rectifier 642 so that the cathode of the binary "1" tube 620 in the second binary pair returns to ground potential. At this time, all of the binary "0" tubes 605, 615, 625 and 635 are in a conductive condition so that the units digit ring 670 provides a binary representation of "0."

In order to provide an operating signal for the tens digit counting chain 680 including only a single pair of binary connected tubes 650 and 655, when the tube 640 is rendered conductive, the positive potential drop across its cathode resistor 643 is forwarded through two pairs of series connected resistors 651 and 652, and 656 and 657 to the control electrodes of the tubes 650 and 655. When the tube 640 is extinguished, an operating pulse is applied to the control electrodes of these two tubes through a pair of coupling condensers 653 and 658. Accordingly, the units digit counting ring 670 provides an enabling potential to the pair of tubes 650 and 655 forming the tens digit chain 680 in response to the receipt of eight mark pulses and provides an operating signal for the chain 680 in response to the receipt of ten mark pulses.

As indicated above, the tens digit counting chain 680 includes only a single binary pair of tubes 650 and 655. The anode of the normally conductive binary "0" tube 650 is directly connected to B+ potential and the anode of the binary "1" tube 655 is connected to B+ potential by the conductor 611 and the normally closed contacts 645, the anode of this tube also being provided with B+ potential through the primary winding of the coupling transformer 261. When the eighth mark pulse is applied to the units digit ring 670, the control electrodes of the tubes 650 and 655 are provided with an enabling potential from the cathode circuit of the binary "1" tube 640. If no additional mark pulses are received, the conductive pattern afforded by the tubes 650 and 655 in the counting chain 680 remains unchanged. However, if ten, eleven, or twelve mark pulses comprise the group of mark pulses forming the designation of the month, i.e., representing the months of October, November and December, the extinguishment of the tube 640 provides an operating pulse which fires the tube 655 and extinguishes the tube 650, thereby providing a representation of the digit "1" in the tens order of the designation of the month.

At the end of the group of mark pulses representing the numerical designation of the month in which the toll call was made, the space pulse operates the steering in circuit 37X so that the positive potential is removed from the conductor 601 and the next tube in the steering in circuit 37X is fired to apply a positive potential to a conductor 701 which conditions a tens days register 700 (FIG. 7) in the clock and calendar register circuit 50 for receiving the next group of mark pulses which comprises the value of the tens days digit. As set forth above, the value of the tens days digit is represented by a group of mark pulses in which a single mark pulse represents "0" and in which ten mark pulses represent the digit "9."

The tens days register 700 comprises a counting circuit including four binary pairs of cold cathode tubes 710 and 715, 720 and 725, 730 and 735, and 740 and 745 which are connected to provide a normal binary counting progression which is identical to that of the units digit counting ring 670 in the clock and calendar circuit 50, except that the counting progression of the register 700 is not modified to reset the register 700 to a "0" representing condition in response to the receipt of ten mark pulses. The binary "0" tubes 710, 720, 730 and 740 include anodes connected directly to B+ potential, whereas the anodes of the binary "1" tubes 715, 725, 735 and 745 are connected to B+ potential by the conductors 611, 621, 631 and 641, as described above. Further, since a single mark represents "0," the binary "1" tubes 715, 725, 735 and 745 are normally in a conductive condition rather than the binary "0" tubes 710, 720, 730 and 740.

Accordingly, when the first mark pulse is applied to the input of the tens days register circuit 700 following the application of an enabling potential to the conductor 701, all of the binary "1" tubes 715, 725, 735 and 745 are rendered nonconductive and the binary "0" tubes 710, 720, 730 and 740 are fired. With the binary "0" tubes in a conductive condition, the register 700 provides a binary manifestation of "0." Therefore, when the second mark pulse is applied to the input of the register 700, the tube 710 is extinguished and the binary "1" tube 715 is fired. Thereafter, the application of the remaining mark pulses in the group representing the value of the tens days digit operates the register 700 as described above in conjunction with the description of the operation of the units digits counting ring 670.

The tens days register 700 also includes means for providing information to the printing control circuit 34 indicating whether the information currently being stored in the electronic registers pertains to a complete or an incomplete call. As set forth above, the date and time information is not provided during the recording of the items of information pertaining to a toll call until after answering supervisory signals have been received from the called substation, thereby indicating the completion of the call. Accordingly, the operation of the tens days register 700 away from its normal condition in response to the receipt of a group of mark pulses representing the value of a tens days digit indicates that the data being transmitted by the seized trunk recorder 25X pertains to a complete call. The tens days register 700 includes a call complete tube 750 which is fired to indicate that the data pertains to a complete call.

More specifically, the control electrode of the tube 750 is connected to the cathode circuit of the normally conductive binary "1" tube 715 by a pair of resistors 751 and 752. Accordingly, the control electrode of the tube 750 is normally provided with an enabling potential. If any mark pulse is received by the tens days register 700 following the application of the enabling potential to the conductor 701, the tube 715 is extinguished, as described above, by the momentary elevation of its cathode potential. This momentary elevation in potential provides a positive pulse which is coupled through a condenser 753 to the control electrode of the tube 750, thereby firing this tube. The anode of the tube 750 is connected by a conductor 754, a pair of normally closed contacts 301, and the operating winding of a call complete relay 230 to B+ potential. The operation of the call complete relay 230 on firing the tube 750 closes a plurality of contacts 231 and 232 and opens a pair of contacts 233. The closure of the contacts 232 prepares a portion of an operating circuit for a print relay 240, and the opening of the contacts 233 interrupts a portion of an operating circuit for a reset relay 300. The closure of the contacts 231 prepares a portion of a control circuit for the printer 36X. Thus, the firing of the call complete tube 750 operates the call complete relay 230 in the printing control circuit 34 to advise this circuit that the stored data pertains to a complete call and does not pertain to an incomplete call. Alternatively, if the call complete relay 230 has not been operated at the time that the end-of-call code is recevied by the printing control circuit 34, this circuit is advised that a resetting operation rather than a printing operation is to be initiated.

The space pulse following the group of mark pulses representing the value of the tens days digit operates the steering in circuit 37X so that the enabling potential is removed from the conductor 701 and is supplied to a units days register in the clock and calendar register circuit 50. Following the storage of the value of the units days digit, the steering in circuit 37X renders the units days register ineffective. Thereafter, the continuing movement of the magnetic tape in the seized trunk recorder 25X causes the transmission of the end-of-call code to the printing control circuit 34. The transmission of the end-of-call code terminates the storage of call data in the electronic registers 42, 44, 46, 48 and 50 and initiates either a cycle of recording operation during which the stored data pertaining to a complete call is printed and then cleared from the registers or a cycle of resetting operation in which the stored data is cleared without printing.

*Recording the Stored Data*

The recording cycle of operation is initiated by the receipt of the end-of-call code which comprises simultaneous mark and space pulses which are coupled through a pair of condensers to a pair of control electrodes of an end-of-call tube 4810X. The application of a mark signal to one of the control electrodes or of a space pulse to the other of the control electrodes is not sufficient to render the tube 4810X conductive. However, the simultaneous application of mark and space pulses to both of the control electrodes of this tube renders the tube conductive and thus signifies the completion of the storage of all of the items of information pertaining to the call, either complete or incomplete. Accordingly, the firing of the tube 4810X initiates the operation of the printing control circuit 34 to either reset the registers 42, 44, 46, 48 and 50 to a normal condition or to initiate a cycle of operation in which the digits stored in these registers are recorded by the printer 36X under the control of the steering out circuit 40.

The firing of the tube 4810X completes an operating circuit for an end-of-call relay 220, which circuit extends through a pair of normally closed contacts 302 to B+ through the lower operating winding of the relay 220. The operation of this relay closes a plurality of contacts 221, 222, 223, 225 and 226 and opens a plurality of contacts 224 and 227. The closure of the contacts 221 completes a holding circuit for an upper winding of the relay 220 extending to ground through a pair of normally closed contacts 212 and the closed contacts 203.

The opening of the contacts 224 interrupts the above described circuit for forwarding operating ground to the clutch mechanism in the trunk recorder 25X and, accordingly, the clutch disengages to terminate movement of the magnetic tape and to interrupt the transmission of additional data to the electronic registers from the trunk recorder 25X. The concurrent closure of the contact 223 applies ground to a conductor 4915X to advise the playback control circuit 30X that the transmission of the information pertaining to the first call has been completed and that the recording operation is to be initiated. The closure of the contacts 222 prepares another portion of an operating circuit for the printer 36X, and the closure of the contacts 225 prepares a portion of a circuit for extending an operating potential to the windings of a plurality of selector magnets 291, 292, 294, 298, 293 and 295 in the printer 36X.

The closure of the contacts 226 forwards ground to the two pairs of contacts 232 and 233 controlled by the call complete relay 230. If this relay has not been operated at this time, an operating circuit for the reset relay 300 is completed through the closed contacts 233. However, as described above, the call complete relay 230 is operated and, accordingly, ground is forwarded to the operating winding of the print relay 240, thereby operating this relay to close a pair of contacts 241 and to open the contacts 242, 243, 244 and 245. The opening of the contacts 242–245 removes B+ potential from the anodes of the binary "1" tubes in all of the counting circuits in the register circuits 42, 44, 46, 48 and 50, but the conductive ones of the tubes therein remain conductive by virtue of the B+ potential forwarded thereto through the primary windings of the coupling transformers 261, 266, 271 and 276. The closure of the contacts 241 completes an obvious operating circuit for a second print relay 250.

The operation of the relay 250 closes a plurality of contacts 251 and 252. The closure of the contacts 252 extends B+ potential from a pair of normally closed contacts 362 controlled by a cam 7250X through a plurality of pairs of closed contacts 306 and 225 to the operating windings of the control or selector magnets 291, 292, 294, 298, 293 and 295 in the printer 36X, thereby to condition these magnets for operation under the control of a plurality of electronic output devices 260, 265, 270, 275, 280 and 285. The closure of the contacts 251 completes an operating circuit for a clutch magnet 7180X in the printer 36X which extends from ground at a pair of normally closed contacts 361 controlled by a cam 7190X through the plurality of closed contacts 311, 231, 222, 251 and 303. The operation of the clutch magnet 7180X initiates a cycle of rotation of a control shaft or roll in the printer 36X during which the selector or code bars controlled by the magnets 291, 292, 294, 298, 293 and 295 cause the selection of a single type bar, the actuation of this type of bar to record a character on a record medium, and the mechanical return of the selector bars and the type bar to their normal positions. Incident to this cycle of rotation, the cams 7190X and 7250X are advanced through a single cycle of rotation. However, during this first cycle of rotation of the control shaft in the printer 36X a character is not printed on the record medium. The above described components of the printer 36X are the same as the similar components in the printer in the above identified Morris et al. patent except that the selector magnets 291, 292, 294, 298, 293 and 295 are operaed in different permutations to cause the printing of alphabetical and numerical characters and to perform control operations.

The closure of the contacts 252 also initiates the step-by-step operation of the steering out circuit 40 (FIGS. 4 and 5) in synchronism with each printing operation of the printer 36X. More specifically, when the contacts 252 are closed, the B+ potential supplied through the closed contacts 306 and 362 is applied to a voltage divider including a pair of resistors 253 and 254 connected between the contacts 252 and ground. The application of the B+ potential to this voltage divider produces a positive going pulse which is coupled through a condenser 255 and a pair of normally closed contacts 322 to the control electrode of a drive tube 350 for the steering out circuit 40. The control electrode of the cold cathode drive tube 350 is normally supplied with an operating potential by a pair of resistors 351 and 352 which are connected between B+ potential and ground. Accordingly, the application of the positive pulse to the control electrode of the tube 350 renders this tube conductive so that a positive potential drop appears across a pair of series connected cathode resistors 353 and 354. This positive pulse is coupled in common to the control electrodes of all of the coutning tubes in the steering out circuit 40, thereby to advance the circuit a single step. Upon the expiration of the positive pulse supplied to the coupling condenser 255, the drive tube 350 is extinguished by relaxation due to the drop across the cathode resistors 353 and 354 and across an anode resistor 355 which is shunted by a condenser 356.

Referring now more specifically to the steering out circuit 40 (FIGS 4 and 5), this circuit includes a plurality of cold cathode discharge tubes 400, 410, 415, 420, 425, 430, 435, 440, 445, 450, 455, 460, 465, 500, 505, 510, 515, 520, 525, 530, 535, 540, 545, 550, 555, 560, 565, 570 and 575 which are connected in a counting chain so that each of these tubes is sequentially fired in sequence during a cycle of operation of the circuit 40. The cathodes of the tubes forming the circuit 40 are either coupled to the electronic registers, such as the months register 600, to provide readout operating pulses thereto or are directly coupled to the electronic output devices 260, 265, 270, 275, 280 and 285 to enter a fixed item of information for recording by the printer 36X at a selected point in the readout program. The steering out circuit 40 is of the type disclosed and described in detail in the above identified article by H. L. Foote.

When the drive tube 350 is fired and extinguished, as described above, to supply a positive pulse to the steering out circuit 40, this pulse is coupled through a series resistor 403 and a coupling condenser 404 to the control electrode of the first tube 400 in the circuit 40. This control electrode is provided with an enabling potential from a voltage divider including a pair of resistors 401 and 402 connected between B+ potential and ground. Accordingly, the first positive pulse supplied by the drive tube 350 in the printing control circuit 40 renders the tube 400 conductive so that a positive voltage drop appears across a pair of series connected cathode resistors 405 and 406. This positive potential is connected to the control electrode of the second tube 410 in the steering out circuit 40 by a resistor 407 to provide an enabling bias for the tube 410 so that this tube is fired in response to the next operation of the drive tube 350.

In addition, the firing of the first tube 400 in the steering out circuit 40 conditions the printer 36X to perform a carriage return and line feed operation prior to the recording of the first line of information on the record medium and thus insures that the first entry of data pertaining to the first toll call begins at a selected marginal position. More specifically, when the tube 400 is rendered conductive, current flows through the tube 400 to B+ potential through a circuit including the primary winding of a coupling transformer 341 and a pair of normally closed contacts 305. The flow of current through the primary winding of the transformer 341 induces a positive pulse which is applied to the control electrode of a carriage return tube 340, the cathode of which is connected directly to ground. The control electrode of the tube 340 is provided with an enabling potential from a voltage divider including a pair of resistors 342 and 343 connected between B+ potential and ground. Accordingly, the coupling of a positive pulse to the control electrode of the tube 340 renders this tube conductive so that current flows through the tube 340 and the winding of a carriage return relay 320 to B+ potential through the closed contacts 305 and a pair of normally closed contacts 312. The operation of the carriage return relay 320 closes a pair of contacts 321 and opens the contacts 322. The opening of the contacts 322 prevents the application of a positive pulse to the drive tube 350 until such time as the carriage return operation has been completed and the relay 320 has been released. The closure of the contacts 321 prepares an operating circuit for a second carriage return relay 330.

Referring back to the initiation of the cycle of rotation of the control shaft in the printer 36X in response to the operation of the clutch magnet 7180X, the initial advancement of the cam 7190X opens the contacts 361 so that the operating circuit for the clutch magnet 7180X is interrupted. However, the clutch magnet 7180X controls a clutch of a one revolution type so that, even though the magnet 7180X is released, the control shaft continues to complete a single cycle of revolution. The continuing rotation of the cam 7250X due to the rotation of the control shaft next opens the contacts 362 and closes a pair of contacts 363. The opening of the contacts 362 removes the B+ potential from the selector magnets 291, 292, 294, 298, 293 and 295 in the printer 36X in addition to removing the B+ potential from the voltage divider including the resistors 253 and 254. The closure of the contacts 363 forwards B+ potential through the closed contacts 321 to complete an obvious operating circuit for the second carriage return relay 330 so that this relay operates to close a pair of contacts 331. The closure of the contact 331 extends B+ potential from the closed contacts 305 and 312 to complete a holding circuit for the relay 330 and also forwards this potential to a pair of neon lamps 281 and 286 which are connected to the control electrodes of the electronic output devices 280 and 285. When the tubes 280 and 285 are rendered conductive to energize the selector magnets 293 and 295, the printer 36X performs a carriage return operation.

Upon continuing rotation of the control shaft during the first cycle of rotation thereof, the cam 7250X next operates to open the contacts 363 and to close the contacts 362. The opening of the contacts 363 interrupts the above described operating circuit for the second carriage return relay 330, but this relay remains operated over a holding circuit extending to B+ potential through the closed contacts 305, 312 and 331. The closure of the contacts 362 extends B+ to the voltage divider including the resistances 253 and 254, but the positive pulse coupled through the condenser 255 is not effective to operate the drive tube 350 inasmuch as the contacts 322 are open. The closure of the contacts 362, however, also forwards B+ potential to the windings of the selector magnets 291, 292, 294, 298, 293 and 295. The B+ potential applied to the windings of the magnets 293 and 295 renders the tubes 280 and 285, which are provided with B+ potential at their control electrodes through the neon lamps 281 and 286, conductive so that the selector magnets 293 and 295 are operated. The operation of these two magnets controls selector bars which cause the printer 36X to perform a carriage return and line feed operation during the next cycle of rotation of the main control shaft. This operation returns the carriage of the printer 36X to its left marginal position and advances the platen one or more steps to move the record medium into a position for receiving the first line of information to be recorded on the toll ticket.

To initiate the carriage return operation of the printer 36X following the firing of the tubes 280 and 285, the continuing rotation of the control shaft to the end of its first cycle of rotation advances the cam 7190X so that the contacts 361 are again closed to complete the above described operating circuit for the clutch solenoid or magnet 7180X. The operation of the magnet 7180X initiates the second cycle of rotation of the main control shaft in the printer 36X during which the carriage return and line feed operations are performed and during which the printer 36X is conditioned for recording the first item of information to be printed on the toll ticket. As the cam 7190X moves away from its normal position, the contacts 361 are again opened to interrupt the operating circuit for the clutch magnet 7180X.

Incident to the performance of this carriage return and line feed operation, a pair of contacts 7220X in the printer 36X are mechanically closed to complete an obvious operating circuit for a line feed relay 310. In operating, the relay 310 opens the contacts 311 and 312. The opening of the contacts 311 interrupts an additional point in the operating circuit for the clutch magnet 7180X, thereby to prevent this magnet from operating to initiate an additional cycle of rotation of the control shaft in the printer 36X until such time as the line feed and carriage return operation has been completed. The opening of the contacts 312 interrupts the circuit extending B+ to the anode of the tube 340 and through the windings of the first and second carriage return relays 320 and 330 so that these relays release and so that the carriage return drive tube 340 is extinguished. The release of the carriage return relay 330 in opening the contacts 331 together with the prior opening of the contacts 312 removes the B+ potential from the neon lamps 281 and 286, thereby to remove the starting potential from the tubes 280 and 285. However, these tubes remain conductive by virtue of the B+ potential supplied to the anodes thereof at the closed contacts 362. In releasing, the carriage return relay 320 opens the contacts 321 and closes the contacts 322. The opening of the contacts 321 interrupts the operating circuit for the second carriage return relay 330 at an additional point. The closure of the contacts 322 connects the coupling condenser 255 to the control electrode of the drive tube 350, thereby to render the drive tube 350 responsive to control by the cam 7250X.

During the second cycle of rotation of the control shaft in the printer 36X during which the carriage return operation is performed, the cam 7250X again opens the contacts 362 and closes the contacts 363. The opening of the contacts 362 removes B+ potential from the windings of the selector magnets 291, 292, 294, 298, 293 and 295 so that the conductive tubes 280 and 285 are extinguished to release the magnets 293 and 295. The closure of the contacts 363 again forwards B+ potential to the contacts 321, but since these contacts have been opened by the release of the carriage return relay 320 the closure of the contacts 363 produces no useful function at this time.

As the control shaft finishes its second cycle of rotation, the cam 7250X again closes the contacts 362 and opens the contacts 363. The opening of the contacts 363 produces no useful function, but the closure of the contacts 362 again supplies B+ potential to the selector magnets in the printer 36X. The closure of the contacts 362 further connects B+ across the voltage divider including the resistors 253 and 254 so that an operating signal is coupled through the condenser 255 and the closed contacts 322 to momentarily fire the drive tube 350 so that a positive operating signal is supplied to the control electrodes of all of the counting tubes in the steering out circuit 40. This operates the circuit 40 a single step to render the first electronic register effective to transmit the value of the digit stored therein to the printer 36X.

More specifically, this positive pulse is coupled through a condenser 411 to the control electrode of the second tube 410 in the steering out circuit 40, as well as to the control electrodes of the remaining tubes in this circuit. However, the control electrode of the tube 410 is provided with an enabling potential through the resistor 407 from the cathode circuit of the conductive tube 405 so that only the tube 410 is rendered conductive. Firing the tube 410 produces a positive drop across a pair of series connected cathode resistors 412 and 413 so that an enabling potential is connected by a resistor 414 to the control electrode of the third tube 415 in the circuit 40. Firing the tube 410 also couples a positive pulse through a condenser 416 and a neon lamp 659 to the control electrode of the binary "1" tube 655 in the tens digit counting chain 680 in the months register 600 of the clock and calendar register circuit 50. This pulse renders the tens digit chain 680 effective to control the operation of the printer 36X during its next cycle of operation so that the value of the tens digit is recorded as the first character in the first line of information on the toll ticket. If the binary "1" tube 655 is in a conductive condition at the time that the tube 410 in the steering out circuit 40 is fired, the application of a positive pulse to the neon lamp 659 does not affect the conductive state of the tube 655. However, if the binary "1" tube 655 is in a nonconductive condition, the pulse supplied by the firing of the tube 410 renders the tube 655 conductive.

When the tube 655 is fired, current flows through the primary winding of the coupling transformer 261, thereby to couple a positive pulse to the control electrode of the electronic output device 260, which electrode is normally provided with an enabling potential by a voltage divider including a pair of resistors 262 and 263 connected between B+ potential and ground. Accordingly, the positive voltage induced in the coupling transformer 261 fires the tube 260 so that the selector magnet 291 is operated. Operating only the selector magnet 291 conditions the selection or combination bars in the printer 36X to cause this printer to record the digit "0" during the next succeeding cycle of rotation of the main control shaft. Alternatively, if the tube 655 had been in a conductive condition as the result of the entry of the months indication into the months register 600 of the clock and calendar register circuit 50, the electronic output device 260 would not have been rendered conductive by the firing of the tube 410 and, accordingly, none of the selector magnets 291, 292, 294, 298, 293 and 295 would have been operated. With none of the selector magnets operated, the code selection bars in the printer 36X cause the printer to record the digit "1". Therefore, the conductive or nonconductive condition of the binary "1" tube 655 in the tens digit counting chain 680 determines whether the printer 36X is to record "0" or "1" as the value of the tens digit of the months designation.

Referring back to the completion of the second cycle of rotation of the control shaft in the printer 36X during which the carriage return and line feed operation is performed, the cam 7190X next closes the contacts 361 to prepare the operating circuit for the clutch solenoid 7180X. If the line feed and carriage return operation has not been completed, as signified by the continuing closed condition of the contacts 7220X, the line feed relay 310 remains operated at this time so that the contacts 311 are open to prevent the completion of the operating circuit for the solenoid 7180X. If this condition exists, the printer 36X interrupts the rotation of the control shaft with the cams 7190X and 7250X in the position illustrated in FIG. 3 of the drawings. At such time as the carriage return and line feed operation is completed, as signified by the opening of the contacts 7220X to release the line feed relay 310 and thus to close the contacts 311 and 312, or when the contacts 361 are first closed by the cam 7190X if the carriage return operation has previously been completed, the above described operating circuit for the magnet 7180X is completed. The operation of the magnet 7180X initiates the third cycle of rotation of the control shaft during which one of the characters "0" or "1" is printed as the first character in the first line of information on the record medium.

During this cycle of revolution of the control shaft, the contacts 362 are again opened and the contacts 363 are again closed. The opening of the contacts 362 removes the B+ potential from the windings of the selector magnets so that the magnet 291, if operated, is released, thereby to condition these magnets for selective operation in accordance with the next character to be recorded by the printer 36X. This continuing rotation of the cams also opens the contacts 361 to release the clutch magnet 7180X. When, during this third cycle of rotation of the control shaft, the contacts 362 are again closed, the operating potential is restored to the selector magnets and a pulse is delivered to the drive tube 350, thereby momentarily firing this tube to supply an operating signal to the steering out circuit 40. This signal operates the third tube 415 in the circuit 40 so that a positive pulse is coupled through a condenser 417 and a plurality of neon lamps 608 to the control electrodes of all of the binary "1" tubes 610, 620, 630 and 640 in the units digit counting ring 670 in the months register 600. This pulse selectively conditions the printer 36X for recording the value of the units months digit.

Assuming that the digit stored in the ring 670 is "5", the binary "1" tubes 610 and 630 are in a conductive condition and the binary "1" tubes 620 and 640 are in a nonconductive condition. Accordingly, when the tube 415 is fired to supply a positive pulse to the coupling condenser 417, this pulse fires the tubes 620 and 640 to draw current through the conductors 621 and 641 and the primary windings of the coupling transformers 266 and 276. These transformers supply operating pulses to the control electrodes of electronic output devices 265 and 275 so that they fire to operate the selector magnets 292 and 298. With these two magnets operated, the code selection or combination bars in the printer 36X are conditioned to select the type bar bearing the numerical character "5" so that this character is printed as the second digit in the first line on the toll ticket.

At the completion of the third cycle of rotation of the control shaft in the printer 36X in which the tens months digit is printed, the cam 7190X closes the contacts 361 so that the clutch magnet 7180X is again operated over the above described circuit to initiate a fourth cycle of rotation of the control shaft in the printer 36X during which this printer records the value of the units months digit "5" under the control of the operated selector magnets 292 and 298. Further, during this cycle of rotation of the control shaft, the contacts 362 and 363 are again operated to release the selector magnets and to momentarily fire the drive tube 350 so that the fourth tube 420 in the steering out circuit 40 is rendered conductive. Firing the tube 420 couples a positive pulse through a condenser 421 to a neon lamp 287 which is connected to the control electrode of the electronic output device 285. This positive pulse fires the tube 285 to operate the selector magnet 295. The operation of the selector magnet 295 conditions the printer 36X to record a dash immediately following the units months digit of the toll ticket, thereby to separate the months portion of the date from the days portion thereof.

At the completion of this cycle of rotation of the control shaft, the cam 7190X again closes the contacts 361 so that the clutch magnet 7180X is again operated to initiate an additional cycle of rotation of the control shaft during which the dash is printed on the toll ticket, the selector magnets are restored to a normal condition, and the steering out circuit 40 is advanced a single step by firing the tube 425 therein. Firing the tube 425 supplies an operating pulse to the control electrodes of all of the binary "1" tubes 715, 725, 735 and 745 in the tens days register 700, the pulse being applied thereto through a plurality of neon lamps 717. The selective application of an operating signal to the binary "1" tubes in the tens days register 700 operates, as described above, to fire those of the binary "1" tubes which are in a nonconductive condition so that a flow of current through the primary windings of the coupling transformers serves to render conductive a group of the electronic output devices 260, 265, 270 and 275 in accordance with the value of the tens days digit. The selective operation of the electronic output devices conditions the printer 36X for recording the value of the tens days digit on the toll ticket immediately following the previously recorded dash.

During the subsequent cycle of rotation of the control shaft in the printer 36X, the value of the tens days digit is recorded and the tube 430 in the steering out circuit 40 is fired to supply an operating signal to a units days counting circuit in the clock and calendar register circuit 50 which is similar to the tens days register 700, thereby conditioning the recorder 36X for recording this digit during the next cycle of operation thereof.

However, it should be noted that the anode of the tube 430 in the steering out circuit 40 is not connected directly to B+ potential through the normally closed contacts 305, but rather is connected to this source of B+ potential through the primary winding of the coupling transformer 341. Accordingly, when the tube 430 is fired, the carriage return tube 340 is rendered conductive, as described above, to operate the carriage return relay 320 so that the contacts 321 are closed and the contacts 322 are opened. Thus, during the next cycle of rotation of the control shaft during which the value of the units days digit is recorded, the closure of the contacts 363 again completes the operating circuit for the second carriage return relay 330 so that this relay operates to close the contacts 331. The closure of the contacts 331 again connects the neon lamps 281 and 286 to B+ potential through the closed contacts 305, 312 and 331.

Accordingly, at the completion of the cycle of rotation of the control shaft in the printer 36X during which the value of the units days digit is recorded, the contacts 363 are opened to interrupt the operating circuit for the second carriage return relay 330, which relay remains operated over the above described holding circuit, and the contacts 362 are closed so that the electronic output devices 280 and 285 are operated to actuate the selector magnets 293 and 295, thereby conditioning the printer 36X for performing a carriage return and line feed operation during the next cycle of rotation of the control shaft. When the contacts 361 are next closed, the clutch magnet 7180X is operated to initiate a succeeding cycle of rotation of the control shaft during which the carriage return and line feed operation is performed. As described above, incident to this operation the contacts 7220X are closed to operate the line feed relay 310 and to cause the release of the carriage return relays 320 and 330 and the extinguishment of the carriage return tube 340. It should be noted that, since the contacts 322 are opened incident to the firing of the tube 430 when the value of the units days digit is transferred to the electronic output devices, the steering out circuit 40 is not advanced during the cycle of rotation of the control shaft during which the units days digit is printed and the carriage return code is transferred to the electronic output devices 280 and 285.

Accordingly, following the release of the carriage return relays 320 and 330 and when the cam 7250X again closes the contacts 362 during the cycle of rotation in which the carriage return operation is performed, the drive tube 350 is rendered conductive to advance the steering out circuit 40 a single step by rendering the tube 435 conductive. The firing of the tube 435 initiates the recording of the second line of information on the toll ticket and, more specifically, directly controls the electronic output devices to enter a fixed item of information into the printer 36X. The second line of information to be recorded on the toll ticket is the designation of the calling office and, since only the digits forming the designation of the calling substation are stored in the electronic register, the tubes 435 and 440 directly prime the electronic output devices with information representing the alphabetical characters forming the calling office designation.

Assuming that the calling office from which the call was placed over the trunk circuit 19X is designated as "TAylor," the firing of the tube 435 applies a positive pulse through a plurality of neon lamps 267, 277 and 288 to the control electrodes of the electronic output devices 265, 275 and 285. Since the selector magnets have been provided with an operating potential concurrently with the operation of the steering out circuit 40, the tubes 265, 275 and 285 operate the selector magnets 292, 293 and 295. The operation of these three magnets conditions the printer 36X for recording the alphabetical character "T" as the first item on the second line of the toll ticket. During the cycle of rotation of the control shaft in the printer 36X in which the first calling office character is recorded, the steering out circuit 40 is advanced a single step under the control of the drive tube 350 so that the tube 440 is rendered conductive. Firing the tube 440 supplies a positive pulse through a pair of neon lamps 264 and 282 so that the electronic output devices 260 and 280 operate the selector magnets 291 and 293 to condition the printer 36X for recording the alphabetical character "A" immediately adjacent the previously recorded character "T" to form the designation of the calling office in which the calling substation is located. During the following three cycles of rotation of the control shaft in the printer 36X, the tubes 445, 450 and 455 are sequentially fired so that the three electronic counting chains in the calling station register 42 selectively operate the output devices 260, 265, 270 and 275, as described in detail above, to record the values of the three calling station digits on the record medium as the remainder of the second line of information thereon. Further, the firing of the tube 455 again operates the carriage return tube 340 to cause the printer 36X to perform a carriage return and line feed operation so that the next group items to be recorded form a third line thereon.

During the next five cycles of rotation of the control shaft in the printer 36X, the tubes 460, 465, 500, 505 and 510 are rendered conductive in sequence. The firing of the tubes 460 and 465 feed information directly to the electronic output devices representing the alphabetical characters "B" and "O" forming an abbreviation of the called office designation of "BOulevard." The firing of the tubes 500, 505 and 510 sequentially renders the three electronic counting chains in the called station register 44 effective to supply information relating to the values of these three digits to the electronic output devices for controlling the selective operation of the printer 36X. It should also be noted that the firing of the tube 510 operates the carriage return tube 340 so that a carriage return and line feed operation is performed following the recording of the last called station digit. This carriage return and line feed operation conditions the printer 36X for recording the fourth line on the toll ticket.

The fourth line recorded on the ticket comprises the time at which the toll call was terminated and, accordingly, the sequential firing of the tubes 515, 520, 525 and 530 under the control of the printer 36X causes the sequential readout of the values of the tens and units hours digits and tens and units minutes digits from the four related counting circuits in the clock and calendar register 50. The firing of the counting tube 530 also operates the carriage return relays 320 and 330 so that a carriage turn and line feed operation is performed following the recording of the units minutes digits, thereby to condition the printer 36X for initiating the printing of the fifth line on the toll ticket.

The fifth line to be recorded comprises the two digits indicating the elapsed time or the length of time during which the toll call was maintained. Therefore, the sequential firing of the tubes 535 and 540 in the steering out circuit 40 by the printer 36X causes a tens minutes counting chain and a units minutes counting ring forming the elapsed time register 46 to be rendered effective to transmit the values of the digits stored therein to the printer 36X. The firing of the tube 540 again operates the carriage return tube 340 and the carriage return relays 320 and 330 so that a carriage return and line feed operation is performed following the recording of the units minutes digit of elapsed time, thereby to condition the printer 36X for recording the sixth line of information thereon.

The sixth line of information comprises the cost to be assessed for the call which has been determined by the cost computer 48 concurrently with the operation of the elapsed time register 46 during the storage of the information in the electronic registers associated with the printing control circuit 34. Accordingly, the firing of the tubes 545, 550, 555 and 560, in sequence, renders a units dollars counting chain and tens and units cents counting rings in the cost computer 48 effective to transmit the values of these digits for recording by the printer 36X. It should be noted that the firing of the tube 550, rather than rendering one of the registers in the computer 48 effective, applies a positive pulse through a neon lamp 283 to the control electrode of the electronic output device 280. The firing of the tube 280 energizes the selector magnet 293 so that the printer 36X is conditioned to record a period immediately following the recording of the value of the units dollars digit. In this manner, a period is provided on the toll ticket between the recorded character representing the value of units dollars and the character representing the value of tens cents. When the tube 560 is rendered conductive to readout the value of units cents digit from the cost computer 48, the carriage return tube 340 is again operated to cause the sequential operation of the carriage return relays 320 and 330. This causes the printer 36X to perform a carriage return operation following the printing of the monetary charge to be assessed for the toll call. During the succeeding two cycles of rotation of the control shaft in the printer 36X, the drive tube 350 renders a pair of carriage return tubes 565 and 570 conductive so that two additional carriage return and line feed operations are performed by the printer 36X to space out the end of the toll ticket.

During the cycle of rotation of the control shaft in the printer 36X during which the second of these carriage return and line feed operations is performed, the cam 7250X closes the contacts 362 to again pulse the drive tube 350 so that the last tube 575 in the steering out circuit 40 is fired. Firing the tube 575 couples a positive pulse through a condenser 576 to the control electrode of a reset tube 205, thereby rendering the tube 205 conductive to complete an operating circuit for the lower winding of the reset relay 300, which circuit extends through a pair of normally closed contacts 215. The operation of the reset relay 300 restores the electronic registers 42, 44, 46, 48 and 50, the steering in circuit 37X, the steering out circuit 40, and the printing control circuit 34 to a normal condition to receive the items of information pertaining to the next toll call and also advises the playback control circuit 30X that the items of information pertaining to the next toll call can be transmitted.

More specifically, the operation of the reset relay 300 opens the contacts 301, 302, 303, 305 and 306 and closes a plurality of contacts 304 and 307. The opening of the contacts 303 interrupts an additional point in the operating circuit for the clutch magnet 7180X so that, when the cam 7190X and 7250X return to the position illustrated in FIG. 3, the clutch magnet 7180X is not again operated and, accordingly, the continuing rotation of the control shaft in the printer 36X is terminated. The opening of the contacts 306 interrupts the above described circuit for supplying B+ potential to the voltage divider including the resistors 253 and 354 and to the operating windings of the selector magnets in the printer 36X.

The opening of the contacts 301 interrupts the above described operating circuit for the call complete relay 230 so that this relay is released and so that the tube 750 is extinguished. The release of the call complete relay 230 releases the print relays 240 and 250 and, in closing the contacts 233, completes a holding circuit for the upper winding of the reset relay 300. The opening of the contacts 302 extinguishes the end-of-call tube 4810X and also opens the operating circuit for the end-of-call relay 220. However, the end-of-call relay 220 is not released at this time due to the holding circuit therefor completed through the closed contacts 203, 212 and 221.

The opening of the contacts 305 removes the B+ potential from all of the tubes in the steering out circuit 40 so that all of these tubes are restored to their normal nonconductive condition and thus conditions the steering out circuit 40 for another cycle of operation. The closure of the contacts 304 applies B+ potential to the steering in circuit 37X to restore this circuit to its normal condition in which it is capable of receiving the space pulses relating to the next toll call stored on the magnetic tape in the trunk recorder 25X.

The closure of the contacts 307 forwards a resetting ground to the cost computer 48 so that this cost computer is restored to a normal condition and the electronic counting chains and rings therein are restored to the settings representing the base charge to be assessed for calls extended between the offices terminating the seized trunk circuit 19X. Incident to this resetting operation, the cost computer 48 forwards ground to complete an obvious operating circuit for a slow-to-release relay 210.

The operation of the relay 210 closes a plurality of contacts 211 and 213 and opens the contacts 214 and 215. The closure of the contacts 211 supplies B+ potential to a resetting conductor 211a which is common to all of the electronic registers. The application of the B+ potential to the conductor 211a is effective through a plurality of neon lamps 603 in the months register 600 and a plurality of neon lamps 702 in the tens days register 700 to prime all of the binary "0" tubes in the ring 670 and the chain 680 and all of the binary "1" tubes in the tens days register 700 into their normal conductive condition so that these registers are restored to their normal conductive conditions, thereby conditioning the electronic registers for receiving the items of information pertaining to the next toll call.

The closure of the contacts 213 forwards ground from the closed contacts 203 to the operating winding of a cut solenoid 7230X in the printer 36X. The operation of the solenoid 7230X operates a web cutting mechanism, such as that disclosed in detail in the above identified Morris et al. patent, so that the portion of the record bearing medium having the data forming the toll ticket is severed from the remainder of the roll.

The opening of the contacts 214 interrupts an additional point in the circuit for applying ground to the conductor 4945X and, accordingly, insures that the clutch mechanism in the seized trunk recorder 25X is not rendered effective to advance the magnetic tape until such time as the resetting operation has been completed. The opening of the contacts 212 interrupts the holding circuit for the end-of-call relay 220 so that this relay releases to aid in restoring the printing control circuit 34 to its normal condition. In releasing, the relay 220 closes the contacts 224, but the prior opening of the contacts 214 prevents the reestablishment of an operative drive for advancing the magnetic tape in the trunk recorder 25X. The opening of the contacts 215 extinguishes the tube 205 and breaks the operating circuit for the lower winding of the reset relay 300. The opening of the contacts 226 upon the release of the relay 220 breaks the holding circuit for the upper winding of the relay 300 so that this relay releases.

Following the completion of the setting operation in the cost computer 48, ground is removed from the operating winding of the relay 210 which, in being slow-to-release, releases after a predetermined time interval to restore the contacts controlled thereby to their normal conditions. The release of the relay 210 completes the restoration of the printing control circuit 34 to its normal condition and thus, the steering in circuit 37X, the steering out circuit 40, the registers 42, 44, 46, 48 and 50, and the printing control circuit 34 have been restored to a normal condition in which they are capable of receiving the items of information pertaining to the next toll call. In releasing, the relay 210 closes the contacts 214 so that ground is forwarded over the conductor 4945X and the playback control circuit 30X to the seized trunk recorder 25X. This initiates movement of the magnetic tape so that the items of information pertaining to the second toll call are transmitted to and recorded by the printer 36X.

This cycle of operation continues until such time as all of the items of information stored in the trunk recorder 25X have been played back and recorded by the printer 36X. Following the completion of the printing of the data stored in the recorder 25X, the playback control circuit 30X releases the seized trunk circuit 19X and seizes the next idle trunk circuit and trunk recorder, which may be the components 40X and 41X. The printing control circuit 34 thereupon causes all of the information stored in the recorder 41X to be transmitted to and stored in the electronic registers 42, 44, 46, 48 and 50 and to be recorded by the printer 36X. Following the completion of the printing of all of the information stored in the trunk recorders to which the switch 30a has access, the playback control circuit 30X, and the printing control circuit 34 are taken out of operation until the next succeeding cycle of operation is initiated under the control of the playback control circuit 30X, as described in detail in the above identified Morris et al. patent.

While the present invention has been described in conjunction with an embodiment thereof adapted for use in storing and recording items of information pertaining to toll calls in an automatic telephone system, it is obvious that the techniques and circuits of the present invention are capable of general application. Further, it is apparent that numerous other modifications and embodiments may be devised by those skilled in the art which will fall within the spirit and scope of the principles of this invention.

What is claimed and desired to be secured by Letters Patent of the United States is:

1. A data handling system comprising an electronic register including a plurality of electronic devices connected as a counting circuit operable to a pattern of conductive conditions representing the value of an entered digit, means normally supplying an operating potential to said electronic devices to permit their sequential operation in said counting circuit, a plurality of output devices, a network coupling at least selected ones of the electronic devices in said register to said output devices, means operative following the entry of a digit into said register for removing said operating potential from said selected ones of the electronic devices in said register and for supplying an operating potential thereto through said network, and means for supplying operating signals to said selected electronic devices to control the selective operation of said output devices.

2. A data handling system comprising a plurality of electronic registers, each of said registers including a plurality of pairs of electronic devices operable to alternate conditions of conduction representing the value of an entered digit, digit utilizing means, a plurality of output devices connected to said digit utilizing means for controlling the operation thereof, each of said output devices being controlled by one of the electronic devices in one of the pairs in each of the registers, a counting circuit including a plurality of progressively operable electronic counting devices, means coupling one of the electronic devices in all of the pairs in one of the registers to one of the electronic counting devices, each of the registers being coupled to a different one of the counting devices in said counting circuit, and means for operating said counting circuit to apply operating signals to said registers in sequence so that said output devices selectively operate said digit utilizing means in accordance with each of the digits entered into said registers.

3. The data handling system set forth in claim 2 including means directly coupling certain of the counting devices in said counting circuit to selected ones of said output devices so that operation of said counting circuit directly controls the operation of said digit utilizing means.

4. A data handling system comprising a plurality of electronic registers, each of said registers including a plurality of pairs of electronic devices and each of said pairs including at least one device having an output electrode, input means for entering digits into said registers by operating the pairs in each register to a pattern of alternate conductive and nonconductive conditions representing the value of the entered digit, digit utilizing means, a plurality of electronic output devices connected to said digit utilizing means for controlling the operation thereof, each of said output devices including a control electrode coupled to the output electrode of one pair in each of the registers, a counting circuit including a plurality of sequentially operated electronic counting devices, each of the registers being connected to and controlled by one of the counting devices, and means operable after the entry of digits into said registers for operating said counting circuit so that operating signals are applied to said registers in sequence to operate said digit utilizing means in accordance with the conductive patterns in said registers.

5. The data handling system set forth in claim 4 in which only the devices having the output electrodes in each of the registers are connected to the counting circuit so that when the counting circuit is operated the control electrodes of the output devices are selectively supplied with signals in accordance with the conductive and nonconductive conditions of the devices having the output electrodes.

6. The data handling system set forth in claim 4 including means controlled by said counting circuit for restoring said registers to conductive patterns representing a normal condition.

7. The data handling system set forth in claim 4 including means operative following the operation of said counting circuit for placing all of the electronic devices having output electrodes in some of said registers in a conductive condition and all of the electronic devices having output electrodes in other registers in a nonconductive condition.

8. The data handling system set forth in claim 4 in which said input means includes a counting circuit operable to render each of said registers effective in sequence to receive signals representing the value of the digit to be entered.

9. In a data handling system, a plurality of registers each adapted to store data, a data utilizing means for receiving the entered data, means connecting said data utilizing means to said registers, a counting chain including a plurality of controlled conduction devices, means for rendering said controlled conduction devices conductive in sequence, a plurality of first means each connected to a selected one of said controlled conduction devices and responsive to the conductive condition of the related controlled conduction device for supplying a read signal, means connecting each of said first means to one of said registers so that the read signal operates the related register to transfer the data stored therein to the data utilizing means, and second means connected to at least some of said selected ones of said controlled conduction devices and responsive to the conductive condition of the related controlled conduction device for operating said data utilizing means to perform a control operation.

References Cited in the file of this patent

UNITED STATES PATENTS

| | | |
|---|---|---|
| 2,301,337 | Sigo | Nov. 10, 1942 |
| 2,366,913 | Le Clair | Jan. 9, 1945 |
| 2,667,538 | Wright et al. | Jan. 26, 1954 |
| 2,739,235 | Vande Sande | Mar. 20, 1956 |
| 2,767,907 | Schwend | Oct. 23, 1956 |
| 2,771,599 | Nolde et al. | Nov. 20, 1956 |
| 2,877,449 | Whitney | Mar. 10, 1959 |
| 2,905,930 | Golden | Sept. 22, 1959 |